United States Patent [19]

Frey et al.

[11] Patent Number: 5,613,086
[45] Date of Patent: Mar. 18, 1997

[54] METHOD AND SYSTEM FOR LOCKING A PAGE OF REAL STORAGE USING A VIRTUAL ADDRESS

[75] Inventors: Jeffrey A. Frey, Fishkill; David C. Manners, Wappinger Falls; Jeffrey M. Nick, Fishkill, all of N.Y.

[73] Assignee: International Business Machines Corporation, Armonk, N.Y.

[21] Appl. No.: 567,861

[22] Filed: Dec. 6, 1995

Related U.S. Application Data

[63] Continuation of Ser. No. 886,273, May 20, 1992, abandoned.

[51] Int. Cl.$^6$ .................................................. G06F 12/14
[52] U.S. Cl. ........................... 395/479; 395/418; 395/490
[58] Field of Search ................................. 395/479, 490, 395/416, 406, 478, 482, 485, 413, 415, 417, 418, 419

[56] References Cited

U.S. PATENT DOCUMENTS

| | | | |
|---|---|---|---|
| 4,373,179 | 2/1983 | Katsumata | 395/400 |
| 4,445,176 | 4/1984 | Burk et al. | 395/200 |
| 4,663,709 | 5/1987 | Fujiwara et al. | |
| 4,695,950 | 9/1987 | Brandt et al. | 395/400 |
| 4,718,008 | 1/1988 | Chang et al. | 395/425 |
| 4,891,749 | 1/1990 | Hoffman et al. | 395/425 |
| 4,937,736 | 6/1990 | Chang et al. | 395/400 |
| 4,991,082 | 2/1991 | Yoshizawa et al. | 395/400 |
| 5,127,094 | 6/1992 | Bono | 395/400 |
| 5,197,139 | 3/1993 | Emma et al. | 395/400 |
| 5,237,668 | 8/1993 | Blandy et al. | 395/400 |
| 5,239,635 | 8/1993 | Stewart et al. | 395/400 |
| 5,249,286 | 9/1993 | Alpert et al. | 395/463 |
| 5,276,847 | 1/1994 | Kohn | 395/490 |
| 5,430,855 | 7/1995 | Walsh et al. | 395/275 |

OTHER PUBLICATIONS

Enterprise Systems Architecture/390, Principles of Operation, SA22-7201-00, IBM Corporation.
IBM Technical Disclosure Bulletin, vol. 24, No. 3, Aug. 1981, "The Page and Segment Locking Schema", pp. 1586–1587.

*Primary Examiner*—Eddie P. Chan
*Assistant Examiner*—Hiep T. Nguyen
*Attorney, Agent, or Firm*—Bernard M. Goldman

[57] ABSTRACT

A LOCK PAGE instruction is provided for locking a page of real storage using a virtual address. The LOCK PAGE instruction includes an operation code which specifies the operation to be performed, a first operand which contains the value of the real address obtained during execution of the LOCK PAGE instruction and a second operand which contains the value of the virtual address of the page to be locked during execution of LOCK PAGE. LOCK PAGE enables an address page or a data page to be locked without requiring the entire address space to be locked. A page is locked when a lock control bit in general register 0 is zero, the page is valid in main storage and a lock bit located in a page table entry is zero. In addition to the above, the technique used by an operating system service for reclaiming a page of real storage is altered to intersect with the LOCK PAGE facility.

8 Claims, 5 Drawing Sheets

METHOD AND SYSTEM FOR LOCKING A PAGE OF REAL STORAGE USING A VIRTUAL ADDRESS

This application is a continuation of application Ser. No. 07/886,273, filed May 20, 1992, now abandoned.

TECHNICAL FIELD

This invention relates in general to the protection of data in data processing systems which use virtual addressing and, in particular, to a method and system which uses a high performance central processing unit instruction to lock a page of real storage.

BACKGROUND ART

Data processing systems which use virtual addressing in multiple virtual address spaces are well known and include systems such as, for instance, the IBM System/390 using MVS controlled programming. The organization and hardware/architectural aspects of the IBM System/390 are described in "IBM System/390 Principles of Operation," Form No. SA22-7201-00. The MVS system, as well as many other data processing systems, includes, for example, a central processing unit (CPU) and a main storage. The CPU contains the sequencing and processing facilities for instruction execution, interruption action, timing functions, initial program loading and other machine-related functions. The main storage is directly addressable and provides for high-speed processing of data by the CPU. The main storage may be either physically integrated with the CPU or constructed in stand-alone units.

With appropriate support by an operating system, a dynamic address translation facility may be used to provide to a user a system wherein storage appears to be larger than the main storage which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage. The virtual storage is considered to be composed of blocks of addresses, called pages. Only the most recently referred-to pages of the virtual storage are assigned to occupy blocks of physical main storage. As the user refers to pages that do not appear in main storage, they are brought in to replace pages in main storage that are less likely to be needed. The swapping of pages of storage may be performed by the operating system without assistance by the user program.

The sequence of virtual addresses associated with a virtual storage is called an address space. With appropriate support by an operating system, the dynamic address translation facility may be used to provide a number of address spaces. These address spaces may be used to provide a degree of isolation between users. Such support can consist of a completely different address space for each user, thus providing complete isolation, or a shared area may be provided by mapping a portion of each address space to a single common storage area. Also, instructions are provided which permit a semiprivileged program to access more than one such address space. Dynamic address translation provides for the translation of virtual addresses from multiple different address spaces without requiring that the translation parameters in the control registers be changed. These address spaces are called the primary address space, secondary address space, and AR-specified address spaces. A privileged program can access also the home address space through the use of the home address space control mode.

The primary address, secondary address, AR-specified address or home address is translated by means of a segment-table designation which at different times, is obtained from different control registers or specified by the access registers. The choice is determined by the translation mode specified in the current program-status word (PSW). Four translation modes are available: primary-space mode, secondary-space mode, access-register mode (AR-mode), and home-space mode. Different address spaces are addressable depending on the translation mode.

At any instant when the CPU is in the primary-space mode or secondary-space mode, the CPU can translate virtual addresses belonging to two address spaces—the primary address space and the secondary address space. At any instant when the CPU is in the access-register mode, it can translate virtual addresses of up to sixteen address spaces—the primary address space, the secondary address space and up to fourteen AR-specified address spaces. At any instant when the CPU is in the home-space mode, it can translate virtual addresses of the home address space.

The primary address space is identified as such because it consists of primary virtual addresses, which are translated by means of the primary segment-table designation. Similarly, the secondary address space consists of secondary virtual addresses translated by means of the secondary segment-table designation, the AR-specified address spaces consist of AR-specified virtual addresses translated by means of AR-specified segment-table designations, and the home address space consists of home virtual addresses translated by means of the home segment-table designation. The primary and secondary segment-table designations are in control registers 1 and 7, respectively. The AR-specified segment-table designations are in control registers 1 and 7 and in table entries called address space number (ASN)-second-table entries. The home segment-table designation is in control register 13.

The selected segment-table designation is used during dynamic address translation to locate a segment table, which is used in locating a page table. These tables, which reflect the current assignment of real storage, are used to translate virtual addresses into real addresses. The assignment of real storage occurs in units of pages, the real locations being assigned contiguously within a page. The pages need not be adjacent in real storage even though assigned to a set of sequential virtual addresses.

When data is transferred to and from, for example, a storage device, the real addresses of the main storage are used rather than the virtual addresses to access data. The data needs to be fixed in real storage for the duration of the transfer. In order to fix or lock the data, an operating system service provided by, for instance, the Real Storage Manager (RSM) of MVS, (which is responsible for managing all of the physical real storage) may, as an example, be used to pin the data in main storage for the duration of the data transfer. The Real Storage Manager requires that the address space containing the page of data to be transferred be locked so that no other service including one provided by a Real Storage Manager running on another central processing unit, is capable of changing the disposition of a page of data within the address space.

The cost of pinning a page of real storage using a service such as that provided by the Real Storage Manager is quite costly. For example, it costs at least 800 CPU cycles to fix a page of real storage the Real Storage Manager. This long pathlength causes performance degradation. In addition, performance is degraded when an entire address space is locked, since no other service capable of altering the disposition of a page is capable of being executed. This performance degradation is intensified in systems where multi-tasking occurs or large amounts of storage is required.

Therefore, a need exists for a locking mechanism which does not degrade system performance. A further need exists for a locking method and system which does not require an address space lock or address space serialization each time a page of real storage is pinned. A yet further need exists for a locking mechanism which decreases the pathlength for fixing a page of real storage.

DISCLOSURE OF INVENTION

The shortcomings of the prior art are overcome and additional advantages are provided in accordance with the principles of the present invention through the provision of a method and system for locking a page of real storage by using a virtual address.

In accordance with the principles of the present invention, a method for locking a page of real storage in a data processing system is provided. The method includes determining whether a lock indicator located in a system table is valid, determining whether the page to be locked is resident within real storage and atomically setting the lock indicator when the lock indicator is not set and the page is resident within real storage.

In one embodiment, the method for locking a page further includes the steps of creating a first copy and a second copy of the page table entry. Further, the step of atomically setting the lock indicator includes comparing the contents of the first copy to the contents of the page table entry and replacing the page table entry with the contents of the second copy when the contents of the first copy are equal to the contents of the page table entry.

In yet another aspect of the invention, a central processing unit adapted to execute an instruction having N bits for locking a page of real storage is provided. The instruction includes an operation code comprising a first portion of N bits, a first operand comprising a second portion of N bits and a second operand comprising a third portion of N bits. The operation code indicates the instruction to be executed by the central processing unit. The first operand specifies a real address of the page to be locked and the second operand specifies a virtual address of the page to be locked.

In one embodiment, execution of the instruction causes one of a locking or an unlocking operation to be performed. The operation to be performed is selected based upon a lock control bit wherein when the lock control bit equals a first state a locking operation is being performed and when the lock control bit equals a second state an unlocking operation is being performed.

In yet another aspect of the invention, a system for serializing real storage within a data processing system is provided. The system includes a lock indicator located in a system table and an operating system service to manage real storage. The operating system service determines when a page of real storage is reclaimable and automatically sets the lock indicator when the lock indicator is not set and the page of real storage is reclaimable.

Further enhancements of the invention are described and claimed herein.

BRIEF DESCRIPTION OF DRAWINGS

The subject matter which is regarded as the invention is particularly pointed out and distinctly claimed in the claims at the conclusion of the specification. The invention, however, may best be understood by reference to the following detailed description taken in conjunction with the accompanying drawings in which:

BEST MODE FOR CARRYING OUT THE INVENTION

Figure 1:
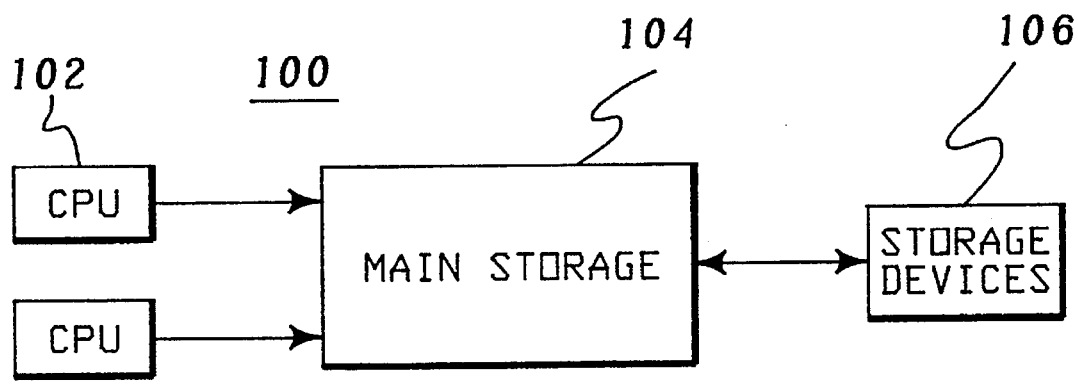
FIG. 1 depicts one example of a block diagram of the hardware components of a system for locking a page, in accordance with the principles of the present invention.

One example of the hardware components associated with a method and system for locking a page of real storage using a virtual address in accordance with the principles of the present invention, is depicted in FIG. 1. As shown in FIG. 1, system 100 includes, for instance, one or more central processing units (CPUs) 102, a main storage 104 and one or more storage devices 106.

In general, central processing units 102 contain the sequencing and processing facilities for instruction execution, interruption action, timing functions, initial program loading and other machine related functions. Central processing units 102 are coupled to main storage 104 which is directly addressable and provides for high-speed processing of data by the CPUs. Main storage 104 may be either physically integrated with the CPUs or constructed in stand-alone units.

Main storage 104 is also coupled to storage devices 106. Data is transferred from main storage 104 to storage devices 106 and from the storage devices back to main storage. In one embodiment, the data transferring operation associated with storage devices 106 is synchronous to the execution of instructions on the CPU and thus, it is advantageous to perform this operation as fast as possible.

Typically, the data to be transferred consists of a page of data which must be fixed in real storage for the duration of the transfer operation. One example of a method and system for fixing or locking a page of real storage in accordance with the principles of the present invention is described in detail herein. Also described in detail is one example of a method and system for unlocking a page of real storage when the page no longer needs to be locked.

Figure 2:
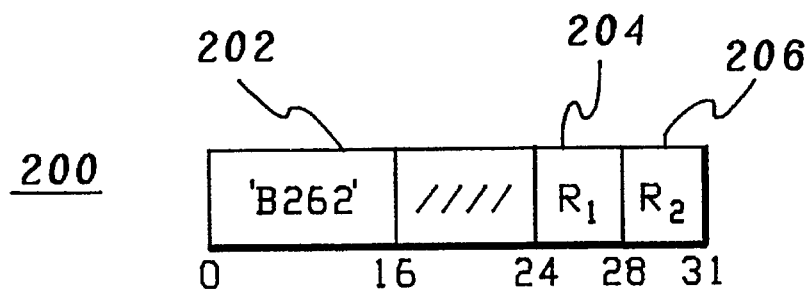
FIG. 2 depicts a block diagram of the LOCK PAGE instruction of the present invention.

Referring to FIG. 2, a central processing unit instruction, referred to as LOCK PAGE (LKPG), will be described. In accordance with the principles of the present invention, a LOCK PAGE instruction 200 consists of an operation code (op code) 202, a first operand 204 and a second operand 206. Op code 202 specifies which operation is to be performed by one or more of central processing units 102 and may be assigned any unique hexadecimal value. First operand 204 refers to the contents of a register designated by an $R_1$ field (also referred to as general register $R_1$) and second operand 206 refers to the contents of a register designated by an $R_2$ field (general register $R_2$). $R_1$ and $R_2$ are used herein to designate general purpose registers and are not associated with any one specific general purpose register.

In accordance with the principles of the present invention, general register $R_1$ is used to store the value of a real address corresponding to a virtual address of a specified page in real storage (described below) and general register $R_2$ contains the virtual address of the specified page.

LOCK PAGE instruction 200 is issued by, for instance, a user program. One example of the logic flow associated with the execution of LOCK PAGE instruction 200 is depicted in FIG. 3 and described in detail below.

Figure 3:
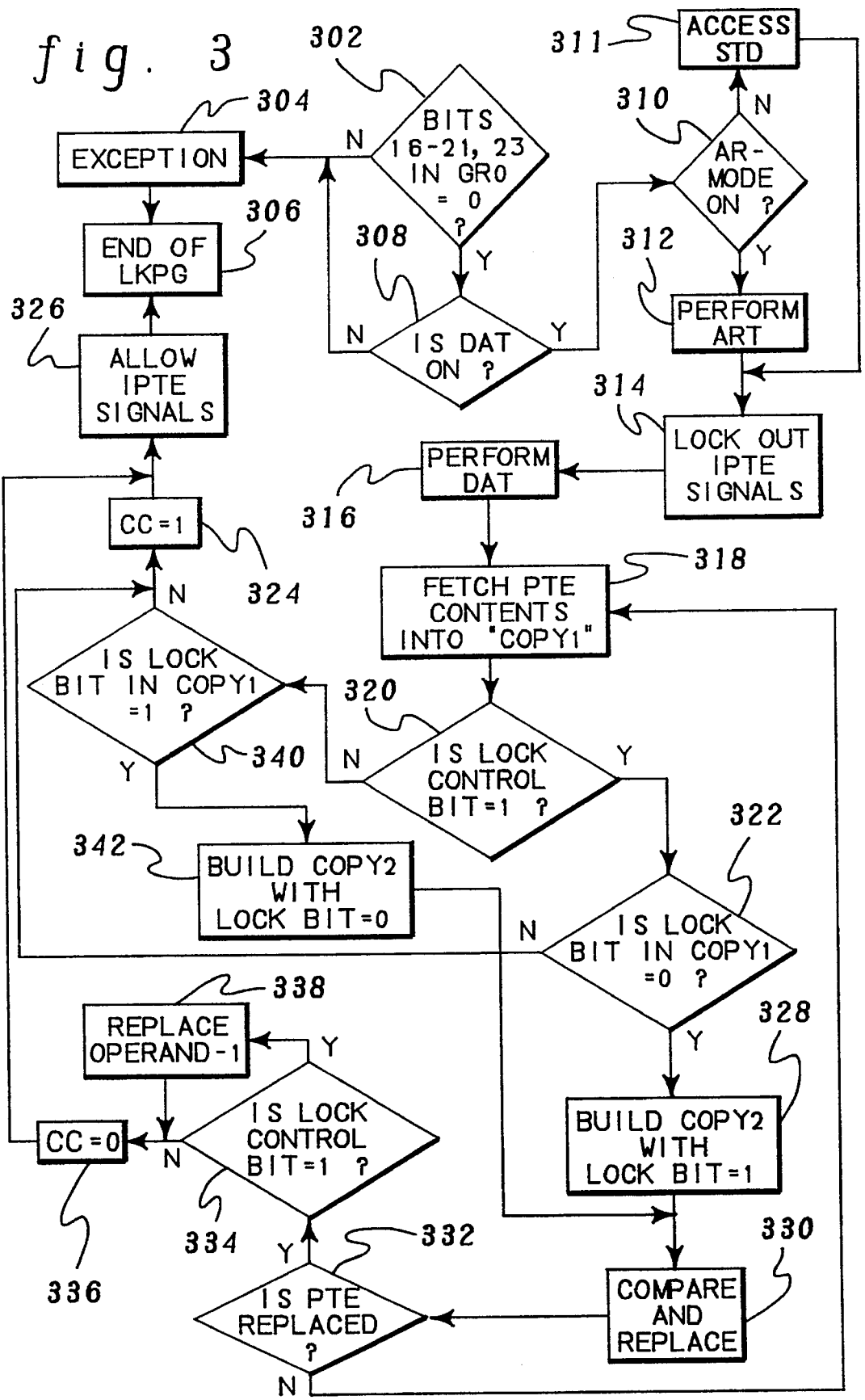
FIG. 3 depicts one example of a logic flow diagram of the LOCK PAGE instruction of FIG. 2, in accordance with the principles of the present invention.

Referring to FIG. 3, in one embodiment, initially a determination is made as to whether bits 16–21 and 23 of general register 0 are equal to zero, INQUIRY 302 "Bits 16–21, 23 in GR0=0?" If these bits are not equal to zero, then a specification exception is recognized, STEP 304 "Exception" and the LOCK PAGE instruction is terminated, STEP 306 "End of LKPG." If, on the other hand, all the bits are equal to zero, then a determination is made as to whether a dynamic address translation (DAT) facility (described below) is available, INQUIRY 308 "Is DAT on?" Should DAT be off, then once again, a specification exception is recognized, STEP 304 "Exception" and LOCK PAGE is terminated, STEP 306 "End LKPG."

Assuming however, that DAT is available, then an inquiry is made to determine if access-register mode (AR-mode) is on, INQUIRY 310 "AR-Mode on?" If access-register mode is off, then a segment-table designation is selected from one of several control registers, STEP 311 "Access STD." In particular, if primary-space mode is specified, then a primary segment-table designation contained within control register 1 is selected. Similarly, if secondary-space mode or home-space mode is specified, then a secondary segment-table designation located within control register 7 or a home segment-table designation contained within control register 13, respectively, is selected. The selected segment-table designation is used, as described below, during dynamic address translation.

Figure 4:
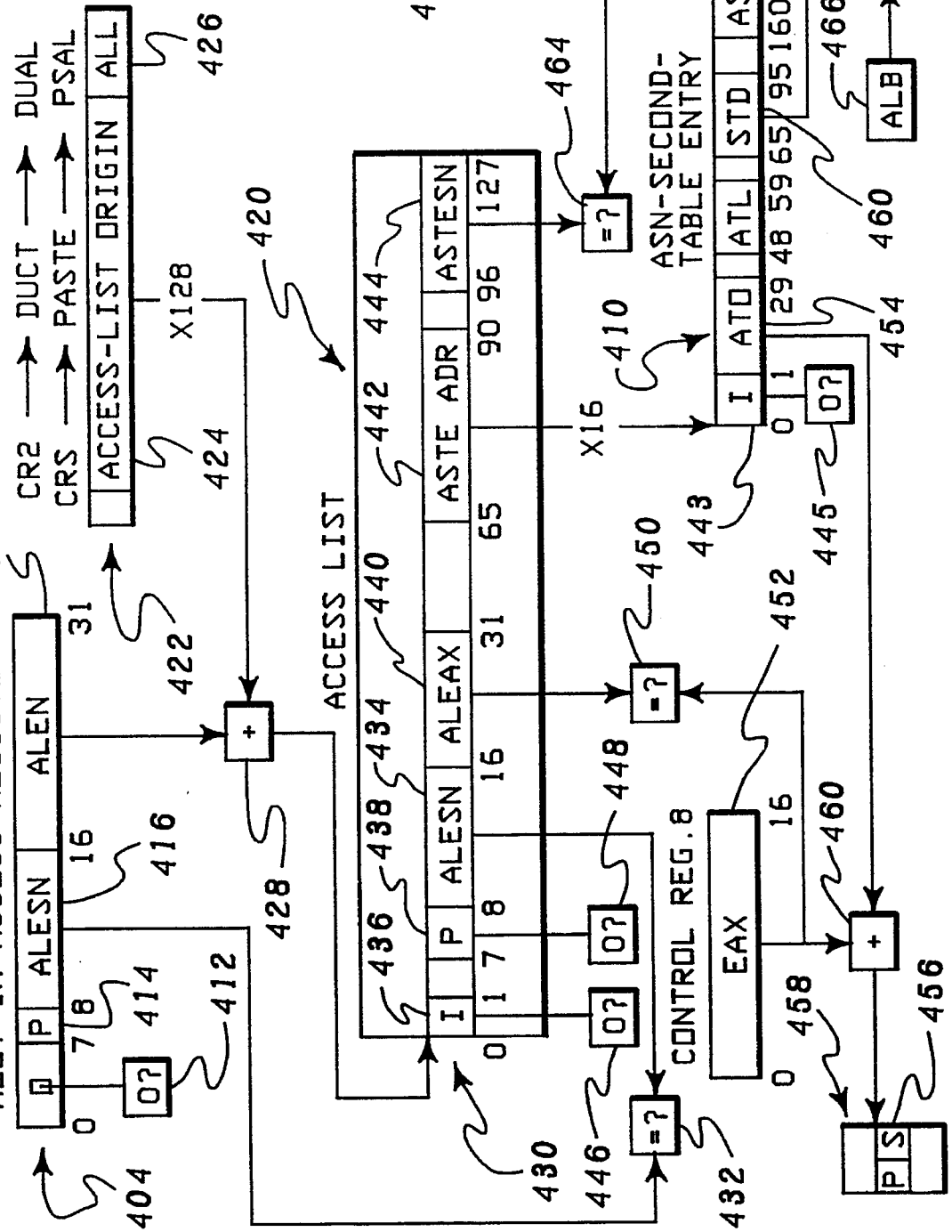
FIG. 4 depicts one example of a logic flow diagram of an access-register translation used in accordance with the principles of the present invention.

Returning to STEP 310, assuming access-register mode is on, then an access-register translation, STEP 312 "Perform ART" is performed as described below with reference to FIG. 4.

Access-register translation is used when access-register mode is on to obtain a segment-table designation (STD) 402 to be used by dynamic address translation, as described more fully below. In one preferred embodiment, access-register translation operates on an access register associated with general register $R_2$ of LOCK PAGE instruction 200. In particular, if general register $R_2$ corresponds to general register 4 (as previously stated, $R_1$ and $R_2$ are generic terms for any one of the general registers of a computer system), then access-register translation operates on access register 4. The contents of the designated access register are referred to as an access-list-entry token (ALET) 404, which is used during access-register translation to obtain STD 402.

During access-register translation, if ALET 404 has a value of 00000000 hex, then a primary segment- table designation 406 located in control register 1 is obtained and, similarly if ALET 404 has a value of 00000001 hex, then a secondary segment-table designation 408 located in control register 7 is obtained. The obtained STD 402 is then used during dynamic address translation as described further below. When ALET 404 is greater than 00000001 hex, then the specified segment-table designation is obtained from an address-space number (ASN)-second-table entry 410 as described in detail below. (The following described process of obtaining the STD from ASN-second-table entry 410 is not applicable when ALET 404 has a value of 00000000 or 00000001 hex.)

Should the value of ALET be other than 00000000 or 00000001 hex, the leftmost seven bits of ALET 404 are checked at 412 to ensure that the bits are all equal to zero. If they are not equal to zero, then a condition code of three (exception condition exists) is recognized and the LOCK PAGE instruction is terminated, Otherwise, processing continues. The condition code mechanism is well known and resides in the program status word, also well known and present in the IBM System/390 machine architecture. The most typical prior art use of the condition code is to report the results of arithmetic comparison of two numbers and not to report unsuccessful address translation. However, because the LOCK PAGE instruction of the present invention reports the exception condition by means of the condition code, the need for a program interrupt (typically used to report such a condition) is eliminated thus avoiding the adverse effects of operating system interrupt handling which may result in the abnormal termination of the user program.

ALET 404 includes a primary-list bit (P) 414, an access-list-entry sequence number (ALESN) 416 and an access-list-entry number (ALEN) 418. Primary-list bit 414 specifies whether an effective access list 420 is a dispatchable-unit access list or a primary-space access list. Should bit 414 be equal to zero, then effective access list 420 is the dispatchable-unit access list. Similarly, if bit 414 is equal to one, then effective access list 420 is the primary-space access list.

Effective access list 420 is designated by an effective access-list designation 422. Effective access-list designation 422 includes an effective access-list origin (ALO) 424 and an effective access-list length (ALL) 426. During access-register translation, ALEN 418 with four zeros appended on the right is added at 428 to the 31-bit real address specified by effective access-list origin 424. (In one example, seven zeros are appended on the right of ALO 424 to form the 31-bit real address.) The result of the addition at 428 is the real address of a designated access-list entry 430 located within effective access list 420. Subsequently, ALEN 418 is compared against effective access-list length 426 with four zeros appended on the left to determine whether ALEN 418 designates an entry 430 within list 420. If the designated entry is outside the boundaries of the list, then a condition code of three is recognized and execution of the LOCK PAGE instruction is terminated.

In addition to the above, access-list-entry sequence number 416 located within ALET 404 is compared at 432 with an access-list-entry sequence number (ALESN) 434 located in access-list entry 430. Should these values be unequal, then a condition code of three is recognized and execution of the LOCK PAGE instruction is terminated. Otherwise, processing continues.

Access-list entry 430 includes an access-list- entry number-invalid bit (I) 436, a private bit (P) 438, ALESN 434, an access-list-entry authorization index (ALEAX) 440, an address-space number-second-table-entry (ASTE) address 442, and an address-space number-second-table entry sequence number (ASTESN) 444. Each of these fields is explained below.

ALEN-invalid bit 436 indicates whether the contents of access-list entry 430 are valid. The value of bit 436 is checked at 446 to determine whether it is equal to zero. If it is equal to zero, then the contents of access-list entry 430 are valid. If, however, bit 436 is equal to one, then the contents cannot be relied on, a condition code of three is recognized and LOCK PAGE is terminated.

Subsequent to determining that the contents of access-list entry 430 are valid, a determination is made as to whether address space number-second-table entry 410 located by appending six zeros on the right of address space number-second-table entry address 442 is valid. In particular, an address space number-second-table index (ASX) invalid bit (I) 443 located within address space number-second-table entry 410 is checked at 445 to determine if entry 410 is valid. Should invalid bit 443 be equal to zero, then the ASTE contents are valid and processing continues. Otherwise, if bit 443 is equal to one, then the contents cannot be relied on, a condition code of three is recognized and LOCK PAGE is terminated.

Also located within ASTE 410 is an address space number-second-table entry sequence number (ASTESN) 462 which is compared at 464 with ASTESN 444. Should the value of ASTESN 444 be unequal to the value of ASTESN 462, then a condition code of three is recognized and execution of LOCK PAGE is terminated. Otherwise, execution of LOCK PAGE continues.

In addition to determining whether the contents of the access-list entry and the address space number-second-table entry are valid, a check is made to determine whether the programs are authorized to use the access-list entry in access-register translation. Private bit 438 is used in this determination. It is checked at 448 to determine whether it is equal to zero. Assuming it is equal to zero, then any program is authorized to use access-list entry 430. However, if bit 438 is equal to one, then authorization is determined by ALEAX 440 as described below.

ALEAX 440 is used in addition to bit 438 to determine whether a particular program is authorized to use access-list entry 430 during access-register translation. ALEAX 440 is compared at 450 with an extended authorization index (EAX) 452 located in control register 8. Should an equality exist, then authorization is granted. If, however, ALEAX 440 is not equal to EAX 452, then EAX 452 is used in conjunction with an authority-table origin (ATO) 454 to select a secondary bit 456 from an authority table 458. In particular, ATO 454 with two zeros appended on the right is added at 460 to EAX 452 with seventeen zeros appended on the left to obtain a 31-bit real address of a byte in authority table 458. The selected byte contains four authority-table entries of two bits each. The rightmost two bits of the authorization index, bits 14 and 15 of control register 8, are used to select one of the four entries. Then, since the authorization test is for a secondary address space number, the right bit (secondary bit 456) is tested. Assuming secondary bit 456 is equal to one, then authorization is granted. However, if secondary bit 456 is equal to zero, then a condition code of three is recognized and execution of LOCK PAGE is terminated.

Assuming the contents of access-list entry 430 and address space number-second-table entry 410 are valid and program authorization is proper, a segment-table designation 460 located within ASTE 410 is accessed during access-register translation and used as obtained STD 402.

To enhance performance, the access-register translation mechanism may be implemented such that access-list designations and information specified in access lists, ASN second tables, and authority tables are maintained in a buffer, referred to as an ART-lookaside buffer (ALB) 466. Then, subsequent access-register translations are performed using the information stored in ALB 466. ART-lookaside buffers are known and thus will not be explained in detail. (For more information on ART-lookaside buffers refer to "IBM System/390 Principles of Operation," Form No. SA22-7201-00.)

Referring to FIG. 3, subsequent to obtaining the appropriate segment table designation, any signals being issued by an invalidate page table entry (IPTE) instruction are prevented from being broadcast on the central processing unit in which the LOCK PAGE instruction is being executed, STEP 314 "Lock out IPTE signals." This ensures that the real address which will be obtained from dynamic address translation, STEP 316 "Perform DAT" (described below) is not altered by the IPTE instruction and remains valid.

Figure 5:
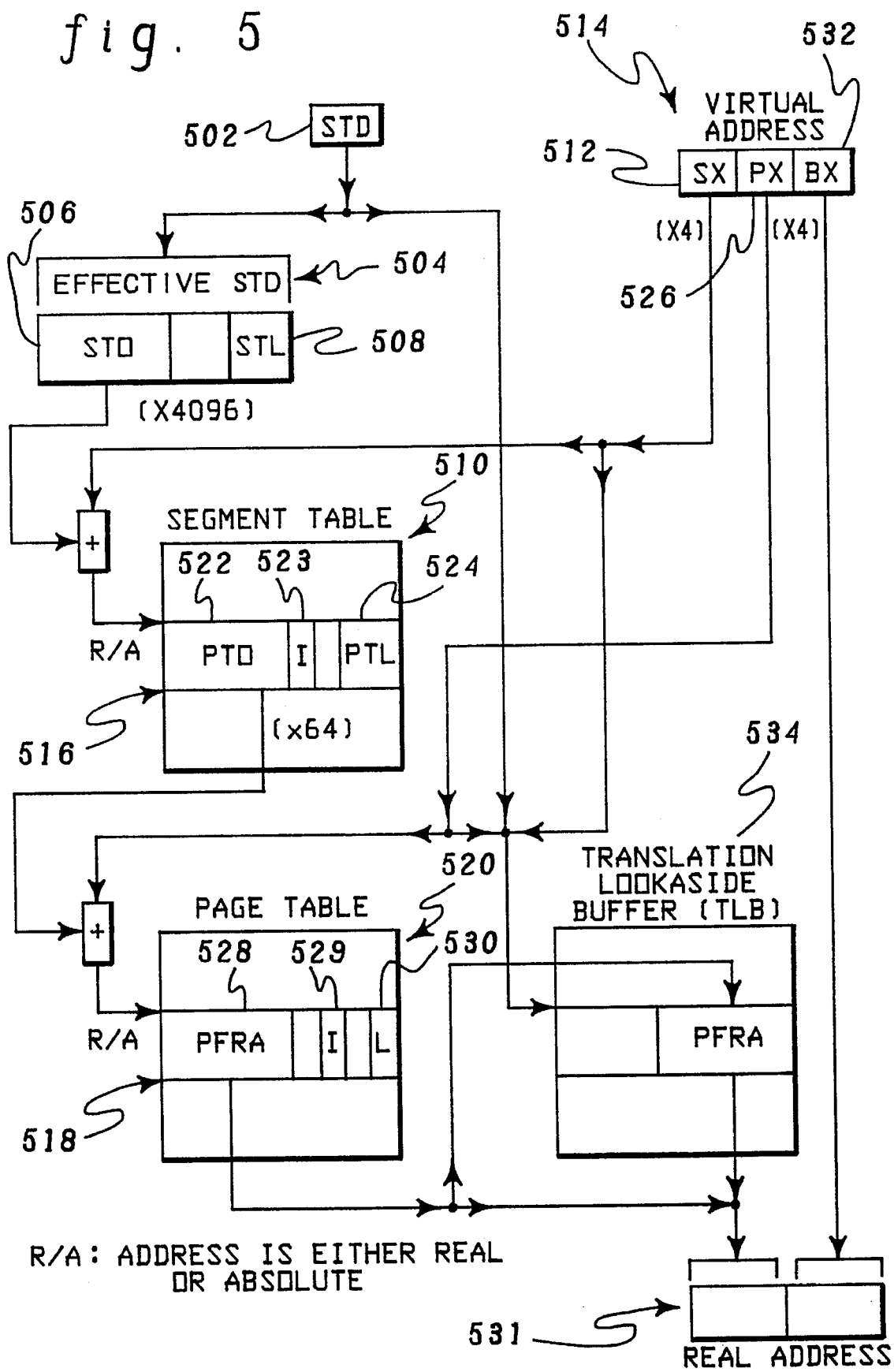
FIG. 5 depicts one example of a logic flow diagram of a dynamic address translation process used in accordance with the principles of the present invention.

Dynamic address translation is described in detail with reference to FIG. 5. Dynamic address translation is the process of translating a virtual address into a corresponding real address. The virtual address may be a primary virtual address, secondary virtual address, AR-specified virtual address or a home virtual address. These addresses are translated by means of the primary, secondary, AR-specified, or the home segment table designation, respectively. The selection of the appropriate segment-table designation was previously described.

The selected segment-table designation 502 obtained either by access-register translation or from control registers 1, 7 or 13 as previously discussed is referred to as an effective segment-table designation 504. Effective segment-table designation 504 contains a segment table origin (STO) 506 and a length (STL) 508 of a segment table 510. STO 506 (bits 1–19 of effective segment-table designation 504) with twelve zeros appended on the right is added to a segment-index (SX) 512 of a virtual address 514 with two rightmost and eighteen leftmost zeros appended in order to select an entry 516 from segment table 510.

Segment-table entry 516 is used to designate an entry 518 in a page table 520. Entry 516 contains a page-table origin (PTO) 522, a segment-invalid bit (I) 523 and a page-table length (PTL) 524. Segment-invalid bit (I) 523 corresponding to bit 26 of segment-table entry 516 controls whether the segment associated with segment-table entry 516 is available. When invalid bit 523 is one, segment-table entry 516 cannot be used for translation and therefore, a condition code of three is issued and execution of the LOCK PAGE instruction is terminated. However, when invalid bit 523 is zero, then DAT processing continues.

Page-table origin 522 consisting of bits 1–25 of segment-table entry 516 with six zeros appended on the right is added to a page-index (PX) portion 526 of virtual address 514 with two rightmost and twenty-one leftmost zeros appended in order to select page-table entry 518.

In accordance with the principles of the present invention, page-table entry 518 contains a page-frame real address (PFRA) 528, a page-invalid bit (I) 529 and a lock indicator bit (L) 530. Each of these fields is described below.

Bits 1–19 of PFRA 528 provide the leftmost bits of a real address 531 that represents the translation of virtual address 514, which is obtained from general register $R_2$. When the leftmost bits are concatenated with a 12-bit byte-index (BX) field 532 of virtual address 514 on the right, a 31-bit real address 531 is obtained.

Page-invalid bit 529 (bit 21 of page-table entry 518) controls whether the page associated with page-table entry 518 is available in main (or real) storage. As with the segment-invalid bit, if page-invalid bit 529 is one, the page-table entry cannot be used for translation and thus, a condition code of three is recognized and LOCK PAGE is terminated. On the other hand, should page-invalid bit 529 equal zero, then processing continues.

Lock bit 530 (bit 31 of page-table entry 518) is used, in accordance with the principles of the present invention, to determine whether the page designated by virtual address 514 is locked. As described further below, if lock bit 530 is equal to zero, then the page is not locked and is available. If, however, lock bit 530 is equal to one, then the page is locked so that the data may be, for example, transferred to a storage device.

In order to eliminate the delay associated with references to translation tables in real or absolute storage, the information fetched from the tables may also be placed in a translation lookaside buffer (TLB) 534, and subsequent translations involving the same table entries (which are discussed above) may be performed by using the information recorded in TLB 534. The operation associated with TLB 534 is known and thus, will not be described in detail herein (see "IBM System/390 Principles of Operation," Form No. SA22-7201-00). However, it should be noted that in accordance with the principles of the present invention, any condition that would normally cause an exception during dynamic address translation (such as, for example, an addressing exception, a segment-translation exception, a translation-specification exception, page-translation exception, etc.) or TLB operation will instead issue a condition code of three, allow any pending broadcast from IPTE to occur and then terminate execution of LOCK PAGE.

Referring once again to FIG. 3, subsequent to performing dynamic address translation, a copy of the contents of the selected page table entry are stored in a variable called "COPY1", STEP 318 "Fetch PTE Contents into Copy1." Next, a determination is made as to whether a locking operation or an unlocking operation is to be performed. Specifically, in accordance with the principles of the present invention, the value of a lock control bit (bit 22 in general register 0) is checked, INQUIRY 320 "Is Lock Control Bit=1?" and if the value of the lock control bit is equal to one, then a locking operation is being performed. Similarly, if the value of the lock control bit is equal to zero, then an unlocking operation is being performed.

When a locking operation is being performed, then a determination is made as to whether the lock bit resident within COPY1 is equal to zero, INQUIRY 322 "Is Lock Bit in COPY1=0?" Assuming the COPY1 lock bit is not zero, then a condition code of one (lock bit already one) is recognized, STEP 324 "CC=1," the IPTE signals are allowed, STEP 326 "Allow IPTE Signals," and execution of LOCK PAGE is terminated, STEP 306 "End of LKPG."

Returning to INQUIRY 322, if the lock bit is equal to zero, then a variable referred to as COPY2 is created, STEP 328 "Build COPY2 with Lock bit=1." COPY2 is a duplicate of COPY1 except that the lock bit is set equal to one.

Subsequent to building COPY2, an indivisible interlocked-update reference (also referred to as an atomic operation) is performed in which the contents of COPY1 are compared to the contents of the page table entry, and if they are equal, then the contents of the page table entry are replaced with the contents of COPY2, STEP 330 "Compare and Replace." If they are unequal, then the page table entry is not replaced. Since the compare and replace operation is atomic, then once the operation begins and a fetch of a particular storage location is made, all store accesses and fetch and store accesses associated with interlocked-update references by other central processing units are prevented from occurring at the same storage location between the fetch and the store access of the compare and replace operation.

After the compare and replace operation is complete, a determination is made as to whether the contents of the page table entry were replaced, INQUIRY 332 "Is PTE Replaced?" If the contents of the page table entry were not replaced, then flow returns to STEP 318 and the contents of the page table entry are fetched once again into COPY1. If, however, the contents of the page table entry were replaced, then lock control bit in general register 0 is checked to see if it is equal to one, INQUIRY 334 "Is Lock Control Bit=1?"

Assuming the lock control bit is one and therefore a locking operation is being performed, the first operand of the LOCK PAGE instruction ($R_1$) is replaced by the real address of the locked page. In particular, the first operand is replaced by bits 1–19 of the page table entry with a zero appended on the left and bits 20–31 of the second operand ($R_2$) appended on the right, STEP 338 "Replace Operand-1." Subsequently, a condition code of zero (lock bit set to one during locking operation) is set and flow returns to STEP 326 "Allow IPTE Signals." Thereafter, execution of the locking operation of the LOCK PAGE instruction is terminated.

If, however, the results of INQUIRY 334 indicate that the lock control bit is equal to zero, then an unlocking operation as described below is being performed.

Returning to INQUIRY 320, the unlocking operation will now be described. When lock control bit in general register 0 is zero and therefore, an unlocking operation is to be performed, an inquiry is made as to whether the lock bit in COPY1 (COPY1 is a copy of the page table entry and thus, the lock bit in COPY1 is equivalent to lock bit 530 in the page table entry) is equal to one, INQUIRY 340 "Is Lock Bit in COPY1 =1?" When the COPY1 lock bit is not equal to one, then a condition code of one (lock bit already zero) is set, STEP 324 "CC=1," the IPTE signals are allowed, STEP 326 "Allow IPTE Signals" and LOCK PAGE is terminated, STEP 306 "End of LKPG."

If, however, the lock bit is equal to one, then COPY2 is created by taking a copy of COPY1 and setting the lock bit in COPY2 to zero, STEP 342 "Build COPY2 With Lock Bit =0." This will cause the page to be unlocked, as described further below. Subsequent to setting the lock bit to zero, flow passes to STEP 330 and execution of LOCK PAGE continues.

In particular, an indivisible interlocked-update reference, as described above, is performed, STEP 330 "Compare and Replace." The contents of COPY1 are compared to the contents of the page table entry, and if they are equal, then the contents of the page table entry are replaced with the contents of COPY2. If they are unequal, then the page table entry is not replaced.

After the compare and replace operation is complete, a determination is made as to whether the contents of the page table entry were replaced, INQUIRY 332 "Is PTE Replaced?" If the contents of the page table entry were not replaced, then flow returns to STEP 318 and the contents of the page table entry are fetched once again into COPY1. If, however, the contents of the page table entry were replaced, then lock control bit in general register 0 is checked to see if it is equal to one, INQUIRY 334 "Is Lock Control Bit =1?"

Assuming the lock control bit is zero and therefore an unlocking operation is being performed, then a condition code of zero (lock bit set to zero during unlocking operation) is recognized, STEP 336 "CC=0" and flow returns to STEP 326 "Allow IPTE Signals." Thereafter, execution of LOCK PAGE is terminated. If, however, the lock control bit is equal to one, then a locking operation as described above is being performed.

As previously described, the LOCK PAGE instruction of the present invention is used to either lock or unlock a page of real storage using a virtual address and to obtain a real address of the locked page. The real address which is obtained during LOCK PAGE is then used to locate the real frame of data. Assuming the real page of data has been locked, then this page may be, for example, transferred to a storage device.

Real storage is managed by an operating system service, such as the Real Storage Manager (RSM) available in MVS systems. RSM is responsible for managing all of physical real storage, including handling page and segment faults and determining when a page of real storage is not being used and thus, can be reclaimed.

In order to ensure the proper management of real storage, in accordance with the principles of the present invention, the Real Storage Manager has been altered in order to provide an intersection with the LOCK PAGE facility of the present invention. In particular, RSM needs to determine whether a page is fixed by LOCK PAGE before it attempts to steal or reclaim that page. The technique for performing this check is described in detail below with reference to FIG. 6.

Figure 6:
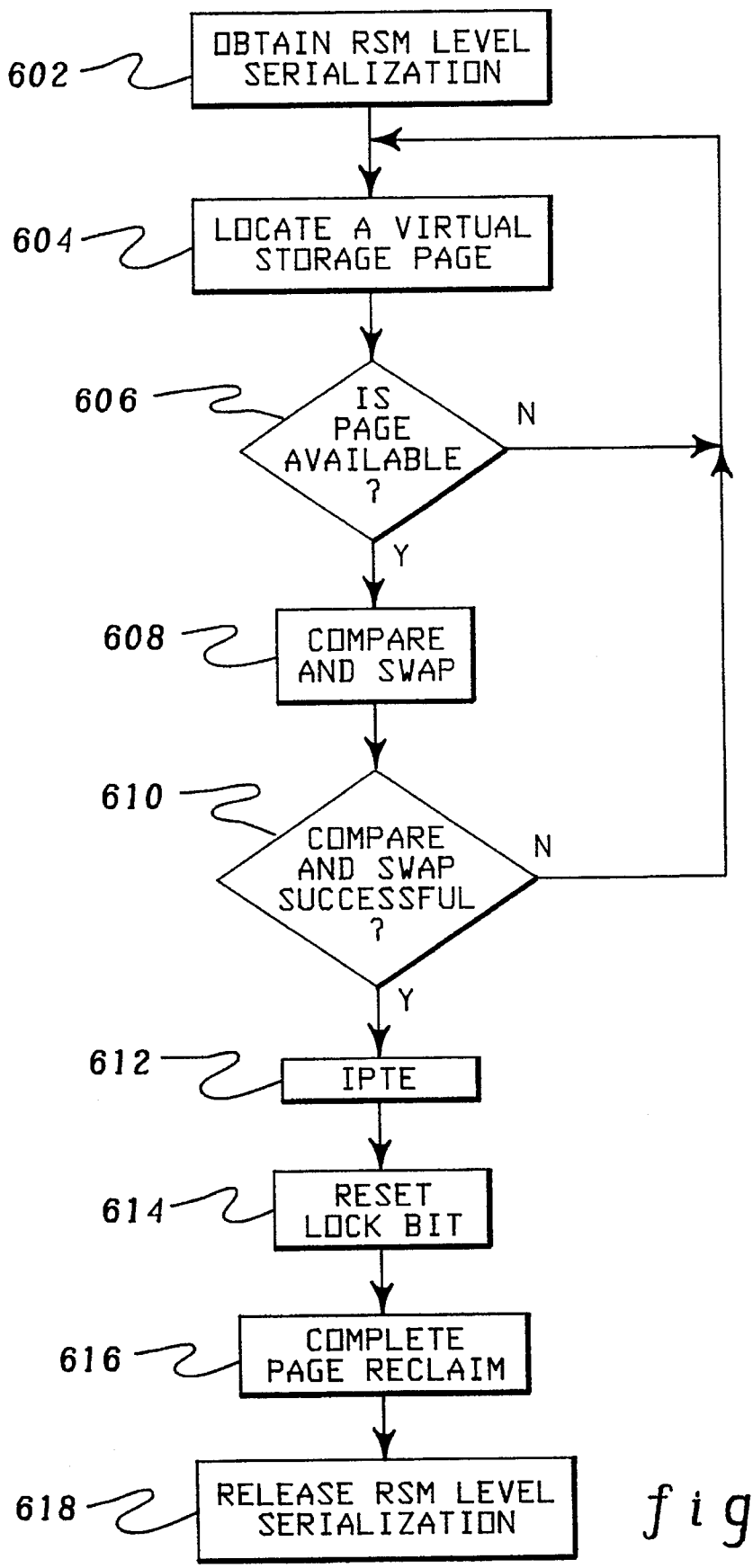
FIG. 6 is one example of a logic flow diagram of an operating system service for reclaiming a page of real storage, in accordance with the principles of the present invention.

Referring to FIG. 6, when RSM would like to reclaim a page of real storage, RSM obtains an address space level lock so that the disposition of any pages within the locked address space are serialized and no other RSM facility running on, for instance, another CPU may alter the disposition of the pages located within the locked address space, STEP 602 "Obtain RSM Level Serialization." Subsequent to obtaining address space level serialization, RSM locates a virtual storage page which is a candidate for reclaiming, STEP 604 "Locate a Virtual Storage Page." That is, the Real Storage Manager locates a page which according to, for instance, an unreferenced interval count, has not been referenced in a predetermined number of machine cycles and therefore, is a candidate for reclaiming. After the candidate virtual storage page is located, a determination is made as to whether the page is valid in main storage (this is accomplished by checking invalid bit 529 (FIG. 5), as described above) and is available for locking (ensure page has not been fixed by another service, e.g. MVS Enterprise Systems Architecture Page Fix Service), INQUIRY 606 "Is Page Available?" Should the page be unavailable for locking, then flow returns to STEP 604 "Locate a Virtual Storage Page." If, on the other hand, the page is available, then a COMPARE AND SWAP operation, such as is available with MVS, is performed, STEP 608 "Compare and Swap."

During the COMPARE AND SWAP operation, lock bit 530 located in page table entry 518 is changed from zero to one thus indicating that the page is locked. In particular, the contents of lock bit 530 are fetched from a specific storage location and then a one is stored in the same location. The COMPARE AND SWAP operation used herein is also referred to as an atomic operation or an interlocked-update reference. In other words, once the COMPARE AND SWAP operation commences, all store accesses and the fetch and store accesses associated with interlocked-update references by other central processing units are prevented from occurring at the same storage location between the fetch and the store access of the COMPARE AND SWAP (an interlocked-update reference). It will be apparent to those of ordinary skill in the art that another operation or method may be used to set the lock bit as long as the operation is atomic. By altering the serialization mechanism (control mechanism) of the Real Storage Manager such that the lock bit is set in accordance with the principles of the present invention, an intersect is provided between LOCK PAGE and the manager of real storage.

Subsequent to completing the compare and swap operation, a determination is made as to whether the operation successfully completed, INQUIRY 610 "Compare and Swap Successful?" If the operation is unsuccessful (e.g. page already fixed by LOCK PAGE), then flow once again returns to STEP 604 so that another virtual page of storage may be located. Assuming, however, that the compare and swap operation is successful, then the page is considered locked and if a LOCK PAGE instruction is issued, it will fail. Subsequently, an invalidate page table entry (IPTE) instruction is issued, STEP 612 "IPTE." As described above, IPTE invalidates the page by setting page-invalid bit 529 (FIG. 5) to one.

In addition to the above, lock bit 530 is reset by setting the lock bit to zero, STEP 614 "Reset Lock Bit" and the page reclaim technique is completed, STEP 616 "Complete Page Reclaim." Subsequently, the address space level lock held by the Real Storage Manager is released so that other services may alter the disposition of pages located within the address space, STEP 618 "Release RSM Level Serialization."

As described above, a method and system for locking and unlocking a page of real storage using a virtual address is described. The method and system advantageously locks only the desired page and does not require an address space level lock to serialize its processing. In addition, an intersection between operating system services, such as RSM, and LOCK PAGE is described. RSM has been altered such that before performing an IPTE during page reclaim, it performs a compare and swap operation which will set the lock bit to one if it is not already set. Therefore, intersection is provided.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as recited in the appended claims.

What is claimed is:

1. A method for selectively controlling locking and unlocking of one or more page frames in a real storage (random access memory) of a data processing system containing one or more central processors (CPUs), said method including the steps of:

controlling a set of general registers in a CPU by a current user of the CPU having access to one or more user-accessible virtual memory pages of the data processing system, setting a lock control field in one of the general registers to one of plural control states for controlling both locked and unlocked states of the one or more user-accessible virtual memory pages, selecting by a user one or more of the user-accessible virtual memory pages to be locked and unlocked by providing in a program one or more lock-control (LKPG) instructions having virtual addresses of each user-accessible virtual memory page to be locked and unlocked, executing the program provided with the one or more lock-control (LKPG) instructions to lock and unlock the selected virtual memory pages according to the control state of the lock control field, each executed LKPG instruction having one or more virtual address operands for selecting one or more of the virtual memory pages, the execution of each LKPG instruction also comprising the steps of:

translating each virtual address in the operand of each LKPG instruction to a real address of an associated real page frame backing a virtual page for the translated virtual address in the real storage, a page table entry (PTE) accessed by the translation process containing a lock indicator field for controlling the locked and unlocked state of the associated real page frame in the real storage, determining whether said associated real page frame is resident in the real storage by a valid state existing for the PTE, and copying the associated page frame into the real storage if not indicated as being in the real storage; and testing the control state of the lock control field during execution of each LKPG instruction, and during the execution of each of the one or more LKPG instructions setting a lock indicator in each associated PTE to the control state of the lock control field to indicate in the PTE a corresponding locked or unlocked state for an associated real page frame to lock and unlock the one or more associated page frames in said real storage during execution of the program.

2. The method of claim 1, further including atomically setting the lock indicator during execution of each LKPG instruction.

3. The method of claim 2, in which the execution steps for each LKPG instruction include accessing the lock control field in a predetermined general register in the data processing system for which each user program may selectively control the locked and unlocked state of a subset of pages of interest to the user program.

4. The method of claim 3, wherein the execution steps for said each LKPG instruction access the virtual address operand contained in one of the general registers.

5. The method of claim 4, in which the execution for each LKPG instruction further comprising the steps of:

creating a first copy of said page table entry and a second copy of said page table entry wherein said first copy and said second copy each contain a copy of said lock indicator located in said page table entry; and setting said lock indicator located in said second copy to the state of the lock control bit.

6. The method of claim 1 for selectively controlling the lock/unlock state of a predetermined set of pages in the virtual memory of a data processing system, wherein said determining step includes testing a page invalid bit in said page table entry for a valid state which indicates said page is resident in real storage.

7. A method for unlocking a preselected virtual memory page of real storage of a data processing system using the method in claim 1, said method for executing each LKPG instruction further including the steps of:

setting the lock control field to an unlocked control state prior to executing the user program;

executing each LKPG instruction in the user program for each page frame to be unlocked for a the subset of pages controlled by the user program in real storage by:

using an interlocked-update operation for each LKPG instruction in the user program to set the lock indicator in each accessed PTE to the unlocked state of the lock control field for each selected associated page frame resident in real storage.

8. A method for fixing a virtual memory page in real storage during execution of a user program in a data processing system using the method in claim 1, said method including the steps of:

setting the lock control field to a locked state prior to executing the user program;

executing the set of LKPG instructions in the user program by:

using an interlocked-update operation to set said lock indicator in each PTE each selected virtual memory page to the locked state of the lock control field.

\* \* \* \* \*